Oct. 4, 1955  E. A. MALICK  2,719,583

FUEL TANK FOR AIRCRAFT

Filed Jan. 2, 1951

INVENTOR.
E. A. MALICK

BY Hudson + Young
ATTORNEYS

United States Patent Office 2,719,583
Patented Oct. 4, 1955

2,719,583

FUEL TANK FOR AIRCRAFT

Emil A. Malick, Bartlesville, Okla., assignor to Phillips Petroleum Company, a corporation of Delaware Application January 2, 1951, Serial No. 203,965

5 Claims. (Cl. 158—46)

This invention relates to an airplane fuel tank. In one embodiment, a porous cell is secured inside the tank shell so as to reduce spewing or slugging loss of liquid fuel and evaporation loss of fuel through the tank vent.

When a fuel tank or container, vented to an exterior pressure P and containing a relatively volatile fuel such as aviation gasoline, jet fuel, and the like, is exposed to a reduction in the pressure P, evaporation of the fuel will take place and the evaporated fuel is lost through the tank vent. The rate of evaporation (and hence rate of loss of fuel vapor through the tank vent) depends upon several factors such as the extent of reduction of the pressure P, the volatility of the fuel, the temperature of the fuel, and the rate of heat input from the exterior to the interior of the container or tank. Other factors that may be involved include the vapor-liquid ratio in the tank, the geometry of the tank, the tank vent size, and the rate at which the pressure P is reduced. In certain applications, such as aircraft, such fuel evaporation loss is highly undesirable, inasmuch as it reduces the operating range and/or endurance of the aircraft. In addition, the formation of vapor can give rise to a very serious fuel pumping problem by causing cavitation or vapor lock at the entrance of the fuel pump transferring fuel from the tank to some other point, such as the engine or other fuel tanks.

Further, of great importance under some circumstances, high or even moderate rates of fuel ebullition, resulting from high rates of evaporation, can give rise to liquid fuel spewing or slugging loss from the tank through the tank vent. Such losses can greatly exceed, under some conditions and with some fuels, the usual equilibrium vapor losses. The term "slugging or spewing loss" as used in this application refers to loss of liquid fuel, as contrasted to fuel vapor, from the fuel tank through the tank vent.

I have invented a fuel tank that substantially reduces the loss of fuel from the tank, through the tank vent, due to evaporation and slugging or spewing. In one embodiment, the fuel tank of my invention comprises a porous cell inside the outer shell of the tank and secured to the bottom of the tank so as to form an annular space between the porous cell and the walls of the tank shell. The porous cell provides the major storage space for the fuel in the tank. The openings in the porous cell are small compared to the vent opening in the outer shell of the tank, but are large enough to permit passage therethrough of fuel liquid and/or fuel vapor.

In another embodiment of the fuel tank of my invention, a second porous cell is secured to the bottom of the fuel tank inside the first porous cell mentioned above, such that a second annular space is formed between the walls of the first and second porous cells.

An object of my invention is to provide a fuel tank that reduces evaporation and slugging or spewing loss of fuel from the tank through the tank vent.

Another object of my invention is to provide pressurization of the fuel in the tank so as to reduce fuel evaporation in the tank.

Another object of my invention is to provide a fuel tank that reduces the rate of vapor release from the tank through the tank vent.

Another object is to provide a fuel tank that improves fuel pump performance by reducing the tendency toward vapor lock or cavitation at the entrance of the pump in the tank.

Another object is to provide a fuel tank having a vapor interface at the interior of the tank between the main body of fuel in the tank and the outer shell of the tank so as to reduce the coefficient of heat transfer between the outer shell of the tank and the main body of fuel in the tank.

Another object of my invention is to provide a fuel tank that increases the range and/or endurance of an airplane.

Other objects will be apparent to those skilled in the art upon reading the disclosure and discussion herein made.

According to my invention in preferred embodiment, a porous cell is secured to a fuel tank, inside the tank, so as to form an annular space between the walls of the porous cell and the outer shell of the tank. The porous cell provides the major storage space for the fuel in the tank, and the openings in the cell are small compared to the vent opening in the outer shell of the tank but are large enough to permit passage of liquid and/or vapor fuel therethrough. The intake to the fuel pump is preferably located at the bottom of the tank inside the porous cell of the tank.

A better understanding of my invention can be obtained by examining the accompanying drawing in connection with the discussion herein made. The drawing is provided to illustrate my invention, and, as various changes in details thereof can be made without departing from the spirit and scope of my invention, I do not desire to be unduly limited thereby.

In the drawing, Figure 1 is a vertical section of one embodiment of my invention wherein a single porous cell is utilized to reduce the evaporation and slugging or spewing loss of fuel from the tank.

Figure 1:
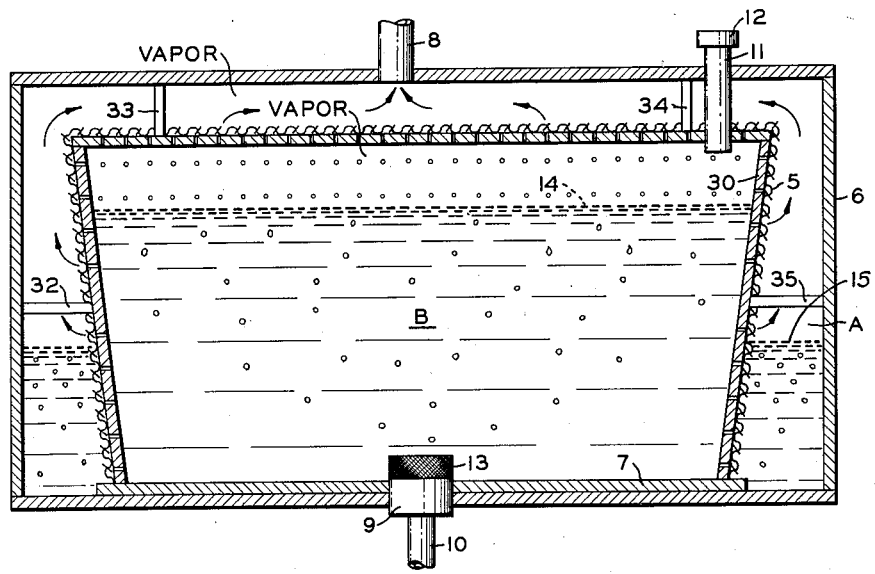

Referring now to Figure 1. Outer shell 6 surrounds porous cell 5 so as to form annular space A between the walls of shell 6 and porous cell 5. Porous cell 5 is secured to shell 6 by plate 7. Porous cell 5 can be constructed of a flexible porous material such as nylon cloth and sustained on a framework 30 so as to prevent collapse of the cell and blockage of the fuel outlet of the tank. It is within the scope of my invention to construct cell 5 with material other than nylon and also to dispense with framework 30 and construct cell 5 of a porous rigid material such as sieve-like sheet metal. Framework 30 can be of sheet metal with holes therein to permit passage of fuel from porous cell 5 into annular space A or framework 30 can be formed by a lattice of metal strips. Any supporting means which will sustain cell 5 and allow passage of fuel therethrough can be utilized to form framework 30.

Shell 6 is provided with vent 8, fuel inlet conduit 11, fuel outlet conduit 10 and fuel pump 9. Fuel inlet conduit 11 is provided with gas-tight cap 12, and fuel pump 9 is provided with screen 13 for straining fuel withdrawn from the tank. Numbers 14 and 15 indicate fuel levels in porous cell 5 and annular space A respectively. Framework 30 is reinforced by bracing members 32, 33, 34, and 35. Said bracing members are particularly desirable when the fuel tank of my invention is used in an airplane which is subjected to rapid and violent changes in flight direction and altitude.

Figure 2:
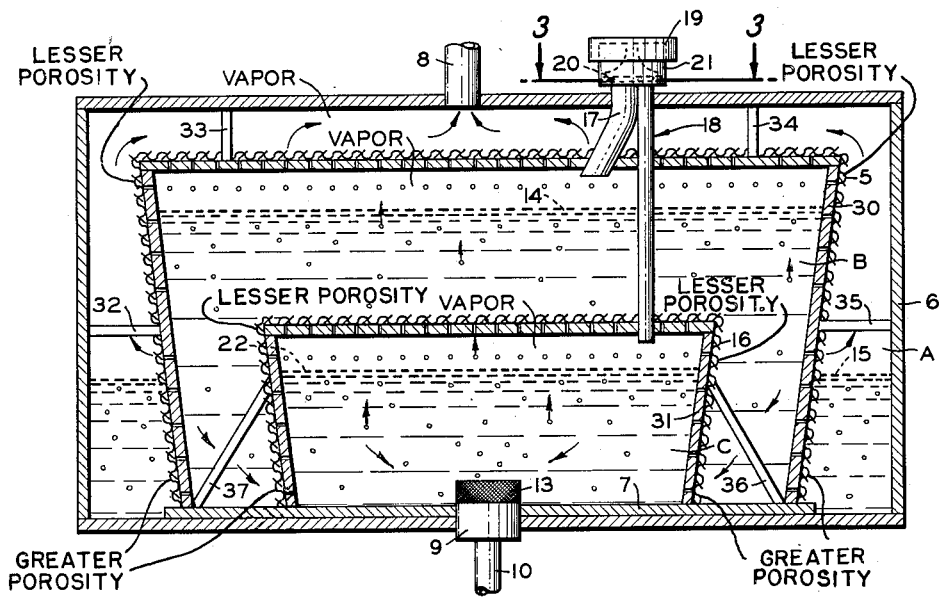
Figure 2 is a vertical section of another embodiment of my invention wherein a second porous cell is placed inside the above mentioned first porous cell to further reduce fuel loss from the tank.
Figure 3:
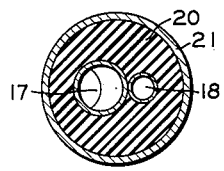
Figure 3 is a cross section taken along line 3—3 of the fuel tank filling conduit of Figure 2.

Referring now to Figure 2. Outer shell 6 surrounds porous cell 5 so as to form annular space A between the walls of shell 6 and porous cell 5. Porous cell 16 is positioned inside porous cell 5 so as to form annular space B between the walls of porous cell 5 and porous cell 16. Porous cell 5 and porous cell 16 are secured to shell 6 by plate 7. Porous cell 5 is sustained by framework 30 and porous cell 16 is sustained by framework 31. Framework 31 is reinforced by bracing members 36 and 37. Comments as to materials of construction of porous cell 5 and framework 30 made in describing Figure 1 also apply to porous cell 16 and framework 31.

Shell 6 is provided with vent 8, fuel pump 9, and fuel outlet conduit 10. Fuel inlet conduits 17 and 18 are secured to shell 6 and open into a common conduit 21 on one end and porous cell 5 and porous cell 16 respectively on the other end. Gas-tight cap 19 is provided to form a seal at the mouth 20 of fuel inlet conduits 17 and 18. Fuel pump 9 is provided with screen 13 for straining fuel withdrawn from the tank. Number 14 indicates the fuel level in porous cell 5, number 15 indicates the fuel level in annular space A, and number 22 indicates the fuel level in porous cell 16.

To illustrate the function of a fuel tank of my invention, assume a condition wherein the tank contains a relatively volatile fuel and the exterior pressure P is reduced to an extent such that the fuel tends to vaporize. The vapor rises to the top of porous cell 5, in the case of the fuel contained in cell 5, and passes through the porous wall of cell 5. Depending upon the porosity or size of the formed openings in the wall of cell 5, flow of vapor is restrained to a moderate or considerable extent as would be desired. This restraint creates a build-up in pressure in the volume enclosed by cell 5 and thereby retards the rate of vapor formation and reduces the rate of vapor loss from the tank through vent 8 since the vapor must pass through porous cell 5 before being vented. Simultaneously, the increased pressure in cell 5 increases the pressure at the entrance of fuel pump 9, thereby reducing cavitation and vapor lock at this point.

The fuel in annular space A vaporizes more readily than the fuel in cell 5 since the fuel in space A is at a lower pressure than the fuel inside cell 5. This tendency of fuel in space A to vaporize provides a means of maintaining a vapor interface between the inner wall of shell 6 and the main body of fuel inside porous cell 5. This vapor interface produces a lower coefficient of heat transfer in space A than would be possible if liquid fuel occupied annular space A. The lower heat coefficient in space A reduces the transfer of heat from the exterior of shell 6 to the main body of fuel in the tank and thus further reduces the rate of vaporization of fuel in the tank and hence further reduces loss of fuel vapor through vent 8. Liquid fuel for vaporization in space A is supplied by liquid fuel passing from inside porous cell 5 to annular space A.

Since liquid fuel must pass through the relatively small openings of porous cell 5 in order to reach space A, spewing or slugging loss of fuel through vent 8 is materially reduced. Also the above mentioned reduction in vaporization of the fuel in the tank aids in reducing the spewing or slugging loss of fuel through vent 8. It is within the scope of my invention to provide a material of varying porosity for cell 5 such that the passage of fuel from cell 5 to space A is less restricted in the lower portion of cell 5 than in the upper portion thereof. This arrangement provides for a positive supply of liquid fuel in space A for vaporization to form the above mentioned vapor interface. Having a porous cell of varying porosity is especially desirable in the modification of my invention as shown in Figure 2. When porous cell 16 is of varying porosity, flow of fuel within the tank is represented by the arrows in that figure, i. e., vapor rises to the top of cell 16, passes through the porous walls of cell 16 and into cell 5 and thence through the porous walls of cell 5 into space A and out vent 8. Liquid fuel in the lower portion of cell 5 flows into cell 16 so as to maintain the fuel supply to fuel pump 9. This positive flow of fuel in the tank stabilizes the fuel in the tank and further reduces slugging loss of fuel through vent 8.

Since liquid fuel flows slowly through the porous wall of cell 5 (and cell 16 in the modification of Figure 2), it is desirable to extend the fuel inlet conduit into these cells to provide for rapid filling of the tank. As the pressure inside the porous cells of the fuel tank of my invention is greater than the pressure external of shell 6 by an appreciable amount, it is desirable to provide the fuel inlet conduit with a gas-tight cap so that this pressure can be maintained.

The fuel tank of my invention can be employed satisfactorily with other auxiliary devices for pressurizing the fuel tank at the vapor vent.

Having read the above discussion and disclosure, it will be apparent to one skilled in the art that various changes in details of materials and construction can be made without departing from the spirit and scope of my invention. Therefore the examples of my invention herein given for purposes of illustration should not be taken to unduly restrict the scope of my invention.

I claim:

1. An airplane fuel tank which comprises an outer shell, a porous inner cell inside said outer shell and secured to said outer shell so as to form an annular space between said porous cell and said outer shell, said porous cell being of such size, with respect to the size of said outer shell, as to provide the major storage space for fuel in said tank, the porosity of the inner cell being such that the flow of vapor from within the inner cell to within the outer shell is restrained to create a build-up in pressure in the inner cell thereby retarding the rate of vapor formation, a vent in said outer shell for venting said annular space, a fuel inlet conduit extending through said outer shell and into said inner porous cell for filling said fuel tank, and means for withdrawing fuel from said porous cell in said fuel tank.

2. An airplane fuel tank which comprises an outer shell, an inner porous cell inside said outer shell and secured to said shell so as to form an annular space between said inner porous cell and said outer shell, the porosity of the inner cell being such that the flow of vapor from within the inner cell to within the outer shell is restrained to create a build-up in pressure in the inner cell thereby retarding the rate of vapor formation, a vent in said outer shell for venting said annular space, a fuel inlet conduit extending through said outer shell and into said inner porous cell for filling said fuel tank, and a fuel outlet conduit extending through said outer shell into said inner porous cell for removing fuel from said inner porous cell in said fuel tank.

3. A fuel tank for airplanes which comprises an outer shell, an inner porous cell inside said shell and secured to the bottom of said shell so as to form an annular space between the walls of said outer shell and said inner porous cell, the porosity of the inner cell being such that the flow of vapor from within the inner cell to within the outer shell is restrained to create a build-up in pressure in the inner cell thereby retarding the rate of vapor formation, a framework secured to the bottom of said shell for supporting said porous cell, a vent in said outer shell for venting said annular space, a fuel inlet conduit for filling said fuel tank extending through said outer shell and said annular space and opening inside said inner porous cell, a gas-tight cap for sealing the opening of said fuel inlet conduit outside of said outer shell, a fuel outlet conduit in the bottom of said tank extending through said outer shell and into said inner porous cell for withdrawing fuel from said inner porous cell in said tank, and a fuel pump associated with said fuel outlet conduit to establish a positive flow of fuel from said inner porous cell in said tank through said fuel outlet conduit.

4. An airplane fuel tank which comprises an outer shell, a first porous cell inside said outer shell, said first porous cell being secured to the bottom of said shell so as to form a first annular space between the walls of said first porous cell and said outer shell, a second porous cell inside said first porous cell, said second porous cell being secured to the bottom of said shell inside said first porous cell so as to form a second annular space between the walls of said second porous cell and said first porous cell, the porosity of said first and second porous cells being such that the flow of vapor from within said cells to within said outer shell is restrained to create a build-up in pressure in said cells, thereby retarding the rate of vapor formation, a vent in said outer shell for venting said first annular space, a first fuel inlet conduit extending through said outer shell and into said first porous cell for introducing fuel into said first porous cell, a second fuel inlet conduit extending through said outer shell and said first porous cell and into said second porous cell for introducing fuel into said second porous cell, means outside said outer shell for sealing the openings in said first and second fuel inlet conduits, a fuel outlet conduit in the bottom of said tank extending through said outer shell and into said second porous cell, and a fuel pump associated with said fuel outlet conduit for providing a positive flow of fuel from said second porous cell through said fuel outlet conduit.

5. An airplane fuel tank which comprises an outer shell, a first porous cell inside said outer shell, said first porous cell being secured to the bottom of said shell so as to form a first annular space between the walls of said first porous cell and said outer shell, a second porous cell inside said first porous cell, said second porous cell being of greater porosity in the lower portion than in the upper portion thereof and being secured to the bottom of said shell inside said first porous cell so as to form a second annular space between the walls of said second porous cell and said first porous cell, the porosity of said first and second porous cells being such that the flow of vapor from within said cells to within said outer shell is restrained to create a build-up in pressure in said cells thereby retarding the rate of vapor formation, a vent in said outer shell for venting said first annular space, a first fuel inlet conduit extending through said outer shell and into said first porous cell for introducing fuel into said first porous cell, a second fuel inlet conduit extending through said outer shell and said first porous cell and into said second porous cell for introducing fuel into said second porous cell, means outside said outer shell for sealing the openings in said first and second fuel inlet conduits, a fuel outlet conduit in the bottom of said tank extending through said outer shell and into said second porous cell, and a fuel pump associated with said fuel outlet conduit for providing a positive flow of fuel from said second porous cell through said fuel outlet conduit.

References Cited in the file of this patent

UNITED STATES PATENTS

| | | |
|---|---|---|
| Re. 22,668 | Paget | Aug. 21, 1945 |
| 1,990,604 | Johnson | Feb. 12, 1935 |
| 2,442,639 | Curtis | June 1, 1948 |